United States Patent [19]

Erwin

[11] Patent Number: 5,194,858
[45] Date of Patent: Mar. 16, 1993

[54] LIGHTING CONTROL SYSTEM WITH SET/RESET GROUND REMOTE

[75] Inventor: William R. Erwin, Rowlett, Tex.

[73] Assignee: The Genlyte Group Incorporated, Secaucus, N.J.

[21] Appl. No.: 752,004

[22] Filed: Aug. 29, 1991

[51] Int. Cl.⁵ .................. G08C 19/12; H01H 47/00; H05B 37/02
[52] U.S. Cl. ................ 340/825.7; 340/825.57; 340/825.58; 340/825.59; 307/140; 315/361
[58] Field of Search .............. 340/825.57, 825.58, 340/825.59, 825.70, 310 R, 310 A; 307/112, 113, 114, 115, 125, 139, 140, 127, 157; 323/322, 905; 200/5 R, 5 A, 42.01; 315/313, 320, 321, 361

[56] References Cited

U.S. PATENT DOCUMENTS

| | | | |
|---|---|---|---|
| 3,842,403 | 10/1974 | Konopka | 340/825.59 |
| 4,090,107 | 5/1978 | Seib | 307/114 |
| 4,538,973 | 9/1985 | Angott et al. | 307/825.69 |
| 4,563,592 | 1/1986 | Yuhasz et al. | 307/140 |
| 4,716,301 | 12/1987 | Willmott et al. | 307/115 |
| 4,823,021 | 4/1989 | Shimada et al. | 307/112 |
| 4,864,482 | 9/1989 | Quazi et al. | 363/37 |

Primary Examiner—Donald J. Yusko
Assistant Examiner—Andrew M. Hill
Attorney, Agent, or Firm—Dennis T. Griggs

[57] ABSTRACT

A lighting load can be turned on/off manually from one or more remote switching stations as well as from a master switch controller station, with ON/OFF control signals produced at the remote switching stations being transmitted to the master controller circuit on the traveler conductor of a conventional single phase AC power distribution system. The main controller has an internal dual mode DC power supply which is referenced to load potential. The dual mode power supply derives operating power from the voltage across the gate controlled power switch which corresponds with essentially hot potential when the power switch is off. The voltage drop across the power switch is boosted by a step-up transformer when the power switch is on. Remote turn-on and turn-off signals are derived independently from the hot power conductor and ground safety power conductor, respectively. Remote turn-on and turn-off of the master power switch is accomplished without interfering with automatic turn-off operation of the controller.

19 Claims, 4 Drawing Sheets

LIGHTING CONTROL SYSTEM WITH SET/RESET GROUND REMOTE

FIELD OF THE INVENTION

This invention relates generally to systems for controlling the application of electrical power to a load, and in particular to multiple station lighting control systems for providing independent ON/OFF operation of lighting from a master switch station and one or more remote switch stations.

BACKGROUND OF THE INVENTION

Electrical loads such as overhead lighting are designed to be powered by one active (hot) conductor carrying AC current and a neutral (return) conductor. Power to an overhead lamp is controlled through an ON/OFF wall switch with operating power being switched through the hot conductor on one side of the lamp load, and with the other side of the lamp load being connected to the neutral conductor.

Conventional lighting control systems provide a main switch control station and one or more remote switching stations providing independent ON/OFF operation. Such systems utilize three-way and four-way switches in combination with one or more traveler wires to effect independent ON/OFF operation at each remote location. In a typical installation in which a single overhead light is controlled from a main station and a remote station, a manual, two-way switch is installed in a wall box at the main switch station, and a manual, two-way switch is installed in a wall box at the remote switch station. One side of the lamp load is connected to the power source neutral conductor, and the other side of the lamp load is connected by a load conductor to the main station switch. A hot conductor connects the hot supply line to the remote switch. The main switch and remote switch are further interconnected by an auxiliary power distribution conductor, commonly referred to as a traveler conductor, a hot conductor and a ground safety conductor. In this two-way switching arrangement, the lamp load is wired in the conventional "switched hot" configuration.

DESCRIPTION OF THE PRIOR ART

Conventional lighting control systems utilize computers and timers to turn the lighting on and off at preset times so that the overhead lighting is on during working hours and off after working hours. However, such systems are not flexible enough to accommodate employees who work irregular hours, for example, maintenance and janitorial personnel who must work during the evening hours.

Automatic switch controllers are now available for applying power to lighting in response to external stimulus, for example, motion activity within a defined area, or rise/fall of outside ambient light level. In domestic lighting applications, for example, automatic switch controllers are available for applying power to room lighting in response to motion activity within the room. Such controllers have a motion sensor which automatically turns off the lighting in the absence of motion activity over a predetermined period of time after everyone has left the room. It will be appreciated that a considerable energy savings can be realized by automatically turning off overhead lighting when the room is not occupied.

Automatic lighting control units which include a motion sensor provide the desired control flexibility to accommodate irregular working hours, and make lighting available for a controlled area whenever motion activity of any kind is sensed. Such automatic control units are wire-for-wire replaceable with standard ON/OFF switches, with the operating power for the controller being derived from the hot conductor through the load.

Such automatic control units include manually operable ON/OFF switches for manual mode operation. Manual OFF is sometimes desirable when the area is occupied, and sufficient natural light from windows and skylights is available. Moreover, a reduced light level may be needed, for example, for a slide presentation. It is desirable to provide independent ON/OFF manual switch operation at each entrance to the controlled lighting area without interfering with the automatic operation of the main controller.

Operating power for the master switch controller is derived from the hot power conductor with only a few milliamperes of current being conducted through the load to the neutral power conductor. Accordingly, the internal power supply circuitry of the master switch controller is referenced to the load potential which is essentially at neutral when the master switch is turned off. In the OFF condition, essentially the full potential of the hot power conductor is available to develop a turn-on control signal. However, when the power switch turns on and conducts, approximately one volt is dropped across its terminals, and the balance of the hot conductor potential is dropped across the lamp load. This means that in the ON state, the controller is referenced to the load potential which is essentially the hot potential minus one volt. The control problem arises because the reference for the internal power supply of the master switch unit shifts from essentially neutral potential to load potential which is near the potential of the hot power conductor.

In conventional control logic circuits which are implemented by bipolar or MOSFET devices, a regulated DC voltage is provided from which a DC operating voltage $V_{cc}$, typically +5 volts is derived. Other voltage levels, for example, high reference voltage and low reference voltage is also derived from the regulated voltage. A voltage range of at least 3 volts is usually required to reliably discriminate between a logic high control signal and a logic low control signal. Typical values are +5 volts DC for $V_{cc}$, +4.2 volts for high reference threshold, and +0.8 volts DC for low reference threshold. For a control signal to be recognized as a logic high signal, it should be more positive than +4.2 volts. For a control signal to be recognized as a logic low signal, it should be less positive than +0.8 volts. Preferably, the logic low control signal should be near reference potential or negative with respect to reference potential.

It will be appreciated that the derivation of a logic high control signal from an internal DC power supply which is load referenced is easily obtained when the master switch is open (OFF), whereby the DC power supply has essentially the entire range from hot conductor potential to reference potential to work from. However, when the master switch is ON, the internal DC power supply has an available operating potential of only about +1 volt DC (for triac power switches) with respect to load reference potential. The problem of turn-off control, given that the automatic controller is in the ON operating condition, has been solved in the past by manually interrupting power to the internal DC power supply, thereby removing the gate control signal and turning off the master power switch. However, this method has proven to be unsatisfactory because without standby operating power, the master switch cannot be operated from remote switching stations, and cannot resume automatic operation without manually re-connecting the internal power supply.

Accordingly, there is a need for providing a meaningful low voltage logic signal for turn-off control purposes when the master switch internal power supply is load referenced, without disconnecting the internal power supply, so that the master control circuit, when turned off, can resume automatic control operation in response to a logic high control signal at the master control station or from a remote station.

Some remote switches have been connected to a master switch controller in such installations, but have required two or more additional conductors and a remote power supply for providing logic high and logic low control signals to the master switch control circuit when the load is turned ON. In a retrofit installation in which the main power switch and remote switch are to be replaced, it is desirable to remove the switches at each switch station and install a main switch controller in the main station wall box and a remote switch in each remote station wall box. Moreover, it is desirable to connect the remote switches to the main switch control circuit by utilizing only the existing traveler conductor and ground safety conductor which interconnect the main and remote wall box switch stations. In new wiring installations, single conductor (e.g., traveler conductor) interconnection of remote switching stations with the master switch station is also desirable for the purpose of simplifying the wiring interconnections, and for reducing wiring installation costs.

OBJECTS OF THE INVENTION

The principal object of the present invention is to provide an improved lighting control system in which a lighting load can be manually turned ON and OFF at remote switch stations as well as at a master switch station.

A related object of the invention is to provide an improved lighting control system of the character described in which a lighting load can be manually switched on and off from one or more remote switching stations as well as from the master switching station, wherein the internal power supply of the master switch derives its operating power from the hot power conductor, and is load referenced in the ON condition.

Another object of the present invention is to provide an improved lighting control system of the character described in which a lighting load can be turned on and off from one or more remote switching stations as well as from the master switching station, with turn-on and turn-off control signals being transmitted to the master power switch control circuit on a single conductor such as the traveler conductor utilized in conventional single-phase AC power distribution systems.

Yet another object of the present invention is to provide an improved lighting control system of the character described in which a lighting load can be turned on and off manually as well as automatically in a master switch station, without disconnecting the internal power supply of the master controller.

SUMMARY OF THE INVENTION

According to the present invention, a lighting load can be turned ON/OFF manually from one or more remote switching stations as well as from a master switch controller station, with ON/OFF signals produced at the remote switching stations being transmitted to the master controller circuit on the traveler conductor of a conventional single phase AC power distribution system. The main controller has an internal dual mode DC power supply which derives operating power from the AC source hot conductor, which is referenced to the load potential. The dual mode power supply provides DC operating voltages in a first operating mode in which the main power switch is turned off, and provides the same DC operating voltages in a second operating mode when the main power switch is turned on.

Logic high and logic low control signals are developed in the master switch controller circuit by a balanced comparator circuit in which the non-inverting terminal of a high limit comparator is connected to the inverting input of a low limit comparator to form a common input. A high reference voltage is applied to the inverting input of the high limit comparator, and a low reference voltage is applied to the non-inverting input of the low limit comparator. A voltage divider provided by identical resistors maintains a balanced DC standby voltage level at the common input.

A turn-on control signal is applied at the master switch station through a manually operated, momentary contact (ON) switch. The momentary ON switch applies a regulated voltage, for example $+V_{cc}$, to the common input terminal, which exceeds the high reference voltage. The output of the high reference comparator transitions from logic zero to logic one, thereby defining a SET control logic signal, which is input to an SR latch. The SR latch enables a driver circuit which turns on a gate controlled power switch such as a triac.

A logic low control signal RESET is developed at the master switch station by applying the reference potential through a momentary contact (OFF) switch to the common input terminal of the balanced comparators. Although the reference voltage is applied to the inverting terminal of the low reference comparator, the reference potential is more positive, thereby causing the low limit comparator output to transition from logic zero to logic one, thereby producing the RESET control logic signal.

In each remote switch, a remote turn-on control signal and a remote turn-off control signal are provided by first and second manually operated, momentary contact switches which are connected in series with the AC source hot conductor and the ground safety conductor, respectively. A first diode is connected in series with the manual turn-on switch for conducting positive phase voltage only. A second diode is connected in series with the second manual turn-of switch for conducting negative phase voltage only. The output terminals of the switches are connected to a common signal conductor, for example, the traveler conductor which is normally found in AC wiring distribution systems.

The remote ON/OFF switches are spring-biased to the open circuit condition so that no signal is transmitted unless the operator presses one of the switches. Closing the positive signal (ON) switch allows conduction of positive phase voltage from the AC source along the traveler conductor to the common input of the balanced comparators. When the positive phase turn-on switch is depressed, positive phase voltage from the hot power source conductor is applied to the common comparator input. The input signal voltage is smoothed and clamped to a voltage level which exceeds the high reference voltage. This causes the high reference comparator to transition from logic zero to logic one, thereby producing a SET control signal. The SET control signal is applied to the SET (S) input of the latch which applies gate control voltage to the triac power switch, thereby turning the lamp load on.

When the manual turn-off (OFF) switch at a remote station is depressed, negative phase current from the AC neutral bus is conducted through the ground safety conductor through the traveler conductor to the common input of the balanced comparators. The negative phase voltage signal is smoothed and clamped to a level which is less positive than the low reference potential applied to the inverting input of the low limit comparator. This causes the low limit comparator output to transition from logic zero to logic one, thereby producing a turn-off control signal RESET. The RESET control signal is applied to the RESET (R) input of the latch which removes the gate control voltage from the triac power switch, thereby turning the lamp load off.

When the controller is turned ON, the input voltage to the internal power supply is reduced to about one volt. A dual mode power supply maintains normal DC operating voltages through a step-up transformer and rectifier circuit. When the triac power switch turns on, the triac switch voltage drop (about 1 volt) input to the power supply is boosted to about 24 VAC by a step-up transformer which is connected into the power input circuit by a relay. When the triac power switch is turned off, the step-up transformer is disconnected from the power input as the relay drops out, and full AC operating power is applied through a coupling capacitor to the AC input of the DC power supply.

The two independent remote switch control signals, positive phase and negative phase produced at each remote station, are transmitted on the traveler conductor to the switch input logic circuit of the main controller. These signals are used in the switch input logic circuit for developing SET and RESET signals which enable and disable the gate circuit which controls conduction through the main power switch. Thus, turn-on and turnoff of the main power switch is initiated remotely. Moreover, turn-off of the master power switch may be accomplished manually or remotely even though the internal power supply of the controller is referenced to load potential. The remote turn-off signal is derived independently from the ground safety power conductor, which is at neutral potential and will be substantially less positive than the low reference potential.

BRIEF DESCRIPTION OF THE DRAWINGS

The novel features of the invention are set forth with particularity in the claims. The invention will best be understood from the following description when read with reference to the accompanying drawings wherein:

DETAILED DESCRIPTION OF THE PREFERRED EMBODIMENT

Figure 1:
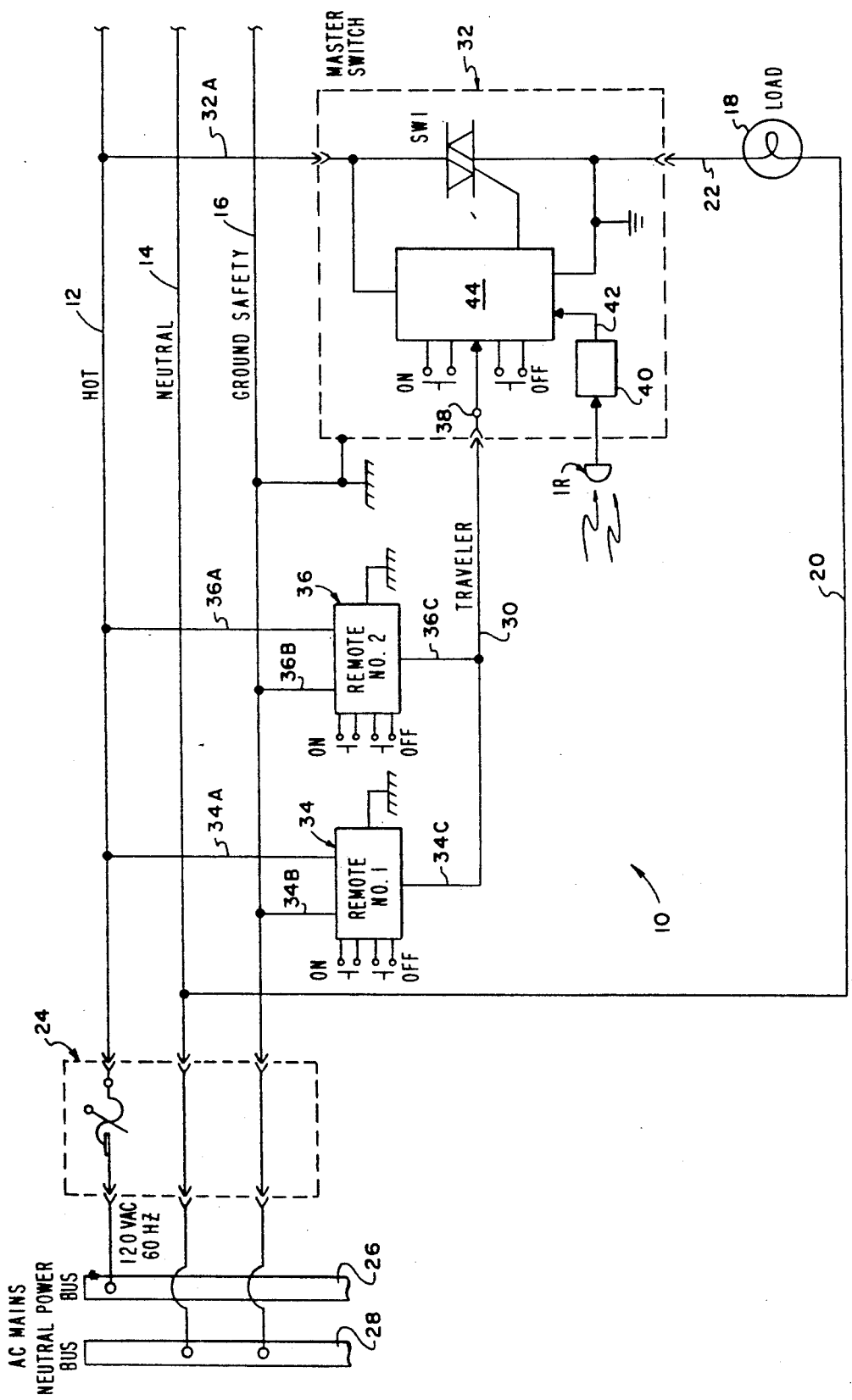
FIG. 1 is a simplified schematic diagram of a lighting control system having an automatic master switch station and a plurality of remote switch stations interconnected only by a traveler conductor.

Referring now to FIG. 1, the lighting control system 10 of the present invention will be described with reference to the hot, neutral and ground safety power conductors 12, 14 and 16, respectively, of a 120 VAC, 60 Hz single phase AC power source which supplies operating power to an incandescent lamp 18. According to conventional AC wiring practice, one terminal of the incandescent lamp 18 is connected to the neutral supply conductor 14 by a load conductor 20, and the other terminal of the lamp 18 is connected to the switched terminal of a master power switch SW1 by a load conductor 22. Preferably, the master switch SW1 is a triac. However, other gate controlled switching devices such as a silicon controlled rectifier may be used as a substitute for the triac.

Operating power is conducted through a thermal circuit breaker 24 which connects the hot conductor 12 to the AC power bus 26. Load current is returned through the neutral conductor 14 to the neutral bus 28. According to conventional practice, the ground safety conductor 16 is also electrically connected to the AC neutral bus and is extended in parallel with the hot conductor 12 along the distribution path for safety purposes. At least the hot conductor 12 and the ground safety conductor 16 will be available at each switch station. A traveler conductor 30 will be available in addition to the hot and ground safety conductors between switching stations which have been wired for two-way, three-way and four-way switching operation.

The lighting control system 10 of the present invention includes an automatic switch controller 32 and one or more remote switches 34, 36. The number of remote switches which can be coupled to the master controller 32 is not limited by fan-out loading, since the remote switches do not draw operating current in the standby operating mode.

Figure 2:
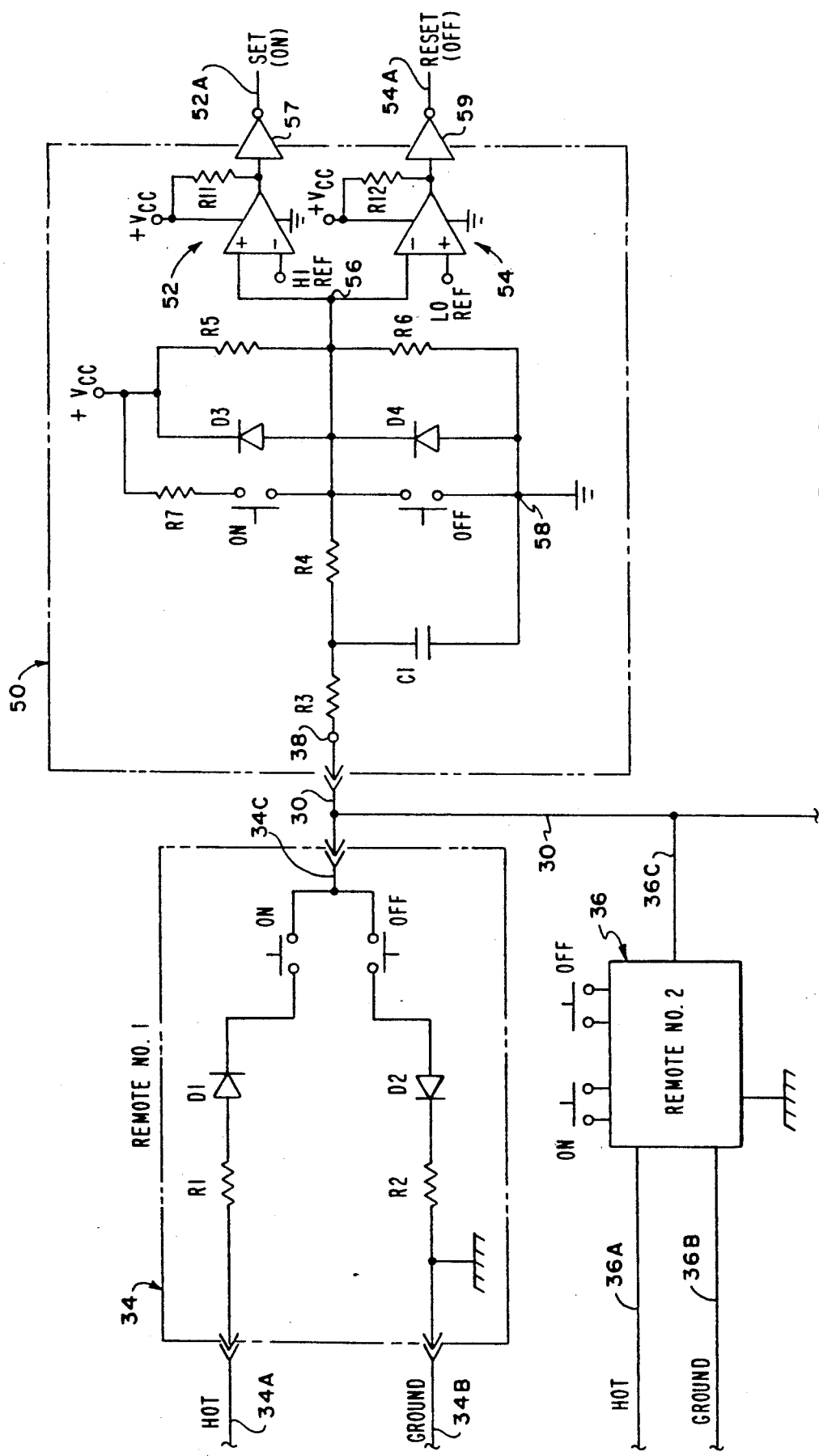
FIG. 2 is a simplified circuit diagram of a remote switch circuit and a switch input logic circuit.

Referring now to FIG. 1 and FIG. 2, the remote switches 34, 36 have identical circuit construction, and the circuit description of remote switch 34 is representative of the description of remote switch 26. The remote switch 34 has a first input conductor 34A connected to the hot power conductor 12 and a second input conductor 34B connected to the ground safety conductor 16. The remote switch 34 also includes a signal output conductor 34C which is electrically connected to the traveler conductor 30 which leads to the automatic controller 32. Likewise, the remote switch 36 includes input power conductors 36A, 36B electrically connected to the hot and ground conductors 12, 16, respectively, and a signal output conductor 36C which is electrically connected to the traveler conductor 30. The traveler conductor 30 is electrically connected to the remote signal input node 38 of the master switch control unit 32.

It will be appreciated that the remote switch stations 34, 36 are widely separated with respect to each other, and with respect to the master switch 32. At each switching station, at least the hot conductor 12, the ground safety conductor 16 and the traveler conductor 30 are available for interconnection.

Consequently, the remote switches 34, 36 and the master switch 32 are wire-for-wire interchangeable with conventional two-way manual power switches. Each remote switch and the master switch include manually operable, momentary contact switches designated ON and OFF, respectively. According to this arrangement, independent ON/OFF manual switch operation is provided at each switching station. Additionally, the master switch 32 includes a motion sensor 40 which produces a control signal 42 in response to motion activity within a defined area. The master switch 32 thus is capable of automatic operation in which the motion sensor 40 automatically turns off the lamp load 18 in the absence of motion activity over a predetermined period of time after everyone has left the room.

The motion sensor 40 may be constructed as disclosed in U.S. application Ser. No. 07/484,066, filed Feb. 23, 1990, now U.S. Pat. No. 5,128,654entitled "PRESET LIGHT CONTROLLER INCLUDING INFRARED SENSOR OPERABLE IN MULTIPLE MODES", and assigned to the assignee of the present invention. Accordingly, the master switch 32 is operable in an automatic mode wherein the turn-off function is produced automatically by a control logic circuit 44. The control logic circuit 44 is responsive to momentary contact ON and OFF switches for manual operation. The master controller 32 has two input terminals and one output terminal, therefore making it wire-for-wire replaceable with a standard two-way power switch.

According to the invention, the improved lighting control system 10 provides that the lighting load 18 can be turned on and off manually and turned off automatically by the master switch 32, and can be turned on and off manually at the remote switch stations 34, 36. This is made possible by a dual mode internal DC power supply 46 which derives its operating power from the hot power conductor 12, and is load referenced in the on condition, as shown in FIG. 1. The turn-on and turn-off control signals from the remote switching stations 34, 36 are transmitted to the master power switch 32 along the single traveler conductor 30. Moreover, because of the dual operating mode of the DC power supply 46, the master control switch SW1 can be operated manually as well as automatically without disconnecting the internal power supply from the AC power mains.

According to this arrangement, the DC operating voltages $V_{cc}$, HI REF and LO REF, are generated even when the master switch SW1 is turned on, so that a meaningful low voltage logic signal for turn-off control purposes can be derived for turn-off control purposes. Moreover, the master control circuit, when turned off, can resume automatic control operation and respond to a logic high control signal applied at the master control station or from a remote switching station.

Referring again to FIG. 2, a remote turn-on control signal and a remote turn-off control signal are provided by first and second manually operated, momentary contact switches designated ON and OFF. The normal ON switch is connected in series with the AC source hot conductor 12 by a wiring conductor 34A. A diode D1 is connected in series with the manual ON switch for conducting positive phase voltage only. Positive phase current flow through the diode D1 is limited by a resistor R1. The resistor R1 is connected in series with the conductor 34A. The manually operated, momentary contact OFF switch is connected in series with the ground safety conductor by a wiring conductor 34B.

A second diode D2 is connected in series with the second manual switch OFF for conducting negative phase voltage only. The diode D2 is connected in series with the ground wiring conductor 34B by a current limiting resistor R2. The output terminals of the ON and OFF switches are connected to the traveler conductor 30 which is normally found in conventional AC wiring distribution systems.

The remote ON/OFF switches are spring-biased to the open circuit conditions so that no signal is transmitted unless the operator presses one of the switches. Closure of the manual ON switch allows conduction of positive phase voltage from the AC hot conductor along the traveler conductor 30 to the common input terminal 38 of a balanced comparator circuit 50. Closure of the manual OFF switch allows conduction of negative phase voltage from the AC neutral conductor along the traveler conductor. A negative phase voltage will be impressed on the neutral conductor 14 and on the ground safety conductor 16 (which is at the same potential) when the triac power switch SW1 is conducting, and also when it is not conducting, since the DC power supply 46 draws operating current from the hot power conductor 12 and returns it through the load 18 to the neutral power conductor 14 when the master power switch SW1 is turned off.

The balanced comparator circuit 50 includes first and second comparators 52, 54. The non-inverting terminal (+) of the high limit comparator 52 is connected to the inverting input (−) if the low limit comparator 54 to form a common input signal terminal 56. A high reference voltage HI REF is applied to the inverting input (−) of the high limit comparator 52, and a low reference voltage LO REF is applied to the non-inverting input (+) of the low limit comparator. A voltage divider provided by identical resistors R5, R6 maintains a balanced DC standby voltage level at the common input node 56. The resistor R5 is connected across $V_{cc}$ and the reference node 56, while voltage divider resistor R6 is connected across the comparator input reference node 56 and common ground reference node 58. The voltage divider circuit defined by resistor R5 and resistor R6 produces a standby bias voltage of one-half $V_{cc}$. In the present example, $V_{cc}$ is +5 volts DC, so that the standby bias voltage level at input node 56 is +2.5 volts DC, which is approximately midway between the low reference voltage of +0.8 volt DC and the high reference voltage of +4.2 volts DC.

A diode D3 is connected in parallel with divider resistor R5, and diode D4 is connected in parallel across divider resistor R6. The purpose of diode D3 is to limit the voltage impressed across the common input terminal 56. The diodes D3, D4 each have a forward voltage drop of approximately 0.6 volts. Accordingly, voltage excursions which appear on input terminal 38, which may have an amplitude of about 90 volts peak, is clamped at the common comparator input terminal 56 at $V_{cc}$ plus the voltage drop across diode D3 when the voltage excursion is positive. When the input signal voltage excursion at input terminal 38 is negative, it is clamped at the potential of the common reference node 58 plus the voltage drop across diode D4. The diodes D3, D4 thus prevent the voltage at the common input node 56 from exceeding $V_{cc}$ or ground reference potential.

Capacitor C1 accumulates a DC charge when an input voltage signal is impressed across input terminal 38. The purpose of the resistor R3 is to limit the current flow through the storage capacitors C1 as it charges in response to the application of a positive phase or negative phase voltage signal on the input terminal 38. The purpose of the resistor R4 is to limit the rate at which the storage capacitor C1 discharges.

The comparators 52, 54 have an open collector output. To provide positive logic operation, the output of each comparator is coupled to $+V_{cc}$ through pull-up resistors R11, R12, respectively. The open collector output of each comparator is coupled to inverters 57, 59, respectively, which produce the SET and RESET control signals.

Figure 3:
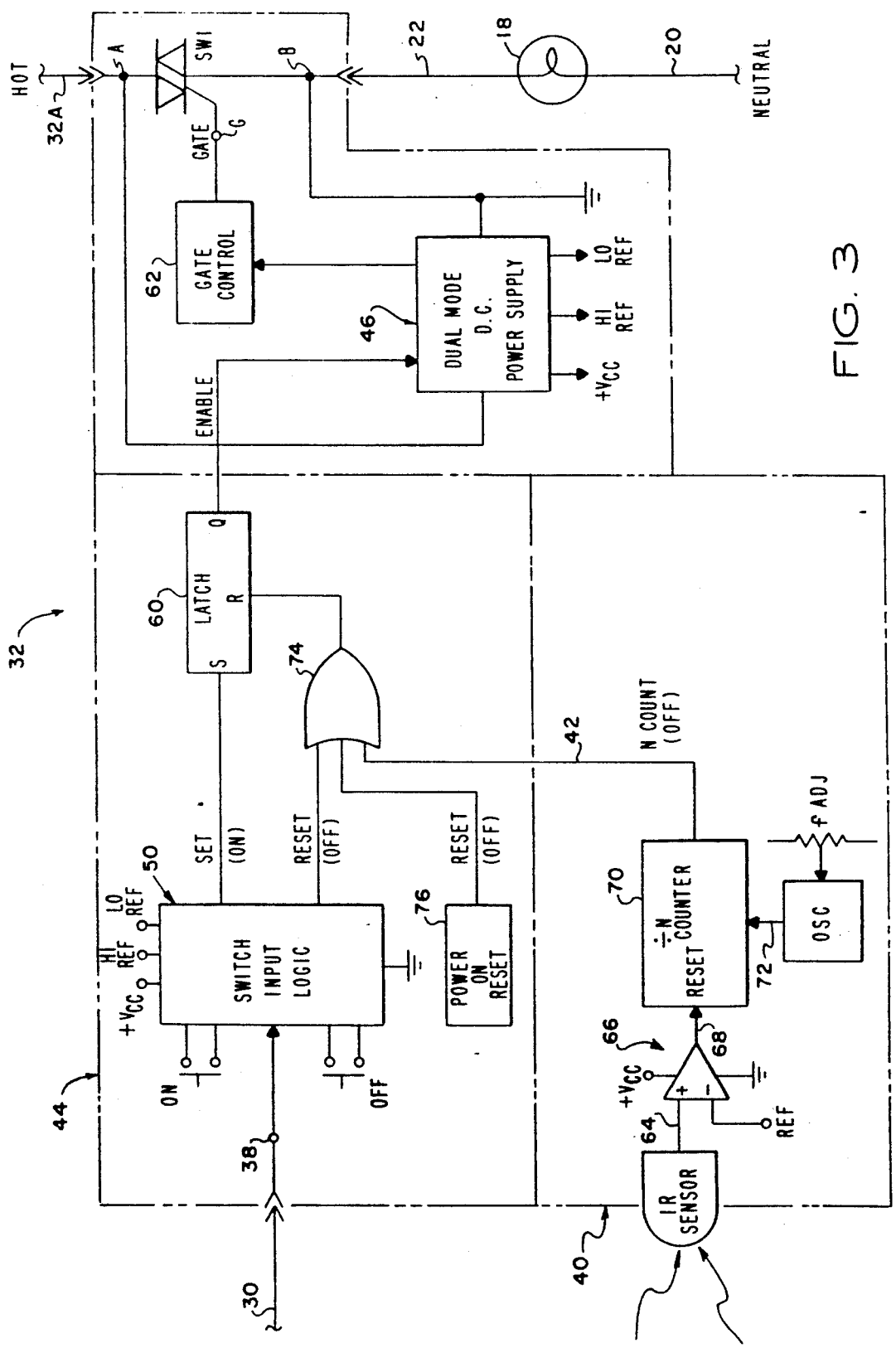
FIG. 3 is a simplified block diagram of the automatic main switch controller shown in FIG. 1.

When the positive phase turn-on switch ON is depressed, positive phase voltage from the hot power source conductor 12 is applied to the common comparator input terminal 38. This input signal voltage is smoothed and clamped to $V_{cc}$ plus the voltage drop across diode D3, which is a voltage level in excess of the high reference voltage HI REF. This causes the high reference comparator 52 to transition from logic zero to logic one, thereby producing a SET (ON) control signal. The SET control signal is applied to the set (S) input of a latch 60 as shown in FIG. 3. The latch 60 applies a gate enable signal ENABLE to the input of a gate control circuit 62. The gate control circuit 62 applies a gate control voltage signal GATE to the gate G of the triac power switch SW1. When the triac power switch SW1 conducts, AC operating power is conducted from the hot power conductor 12 through the wiring conductor 32A to the hot load conductor 22, thereby energizing the lamp load 18, with current being returned to the neutral power conductor 14 through load conductor 20.

The low limit comparator 54 is not affected by a positive phase signal on the input terminal 38 since the voltage applied to its inverting input (−), is more positive than the low reference voltage applied to its non-inverting (+) input. Thus, the output 52A of the high limit comparator 52 transitions from logic zero to logic one in response to a positive phase signal being conducted from the remote switching station 34. The low limit comparator 54 is not affected, and its output 54A remains at logic zero during this time.

Upon actuation of the momentary contact switch OFF at the remote switching station 34, negative phase voltage is conducted from the ground safety conductor 16, which is at the same potential as the neutral conductor 14. As the storage capacitor C1 charges to a negative value, the common input node 56 is clamped at one diode drop below the reference potential of the common reference node 58. This value is typically minus 0.6 volts DC, which is substantially below the LO REF voltage applied to the non-inverting input (+) of the low limit comparator 54. When this occurs, the LO REF voltage at the non-inverting input of low limit comparator 54 is in excess of the voltage level applied to its inverting input (−), thereby causing the output 54A of the low limit comparator 54 to transition from logic zero to logic one, and producing a RESET (OFF) control signal.

Turn-on and turn-off control signals are developed manually at the master switch station 32 through momentary contact switches ON and OFF. Referring again to FIG. 2, the momentary contact ON switch within the comparator circuit 50 is connected between $V_{cc}$ and the common input node 56 through a resistor R7. When the momentary contact ON switch is depressed, the voltage potential of plus $V_{cc}$ is applied to the common comparator input terminal 56. This causes the high limit comparator 52 to transition from logic zero to logic one, since its non-inverting input (+) exceeds the HI REF voltage applied to its inverting input (−). Thus, the high limit comparator 52 transitions to logic one, thereby producing the SET turn-on control signal when the manual switch ON is depressed.

The master switch SW1 can be turned off manually by depressing the momentary contact switch OFF within the comparator circuit 50. When the momentary contact switch OFF is depressed, the potential on the common input comparator input node 56 is pulled to the ground reference potential on the referenced node 58. In this example, the ground reference potential is zero, so that the potential on the inverting input (−) of the low limit comparator is less positive than the LO REF potential applied to its non-inverting input (+). Consequently, upon closure of the momentary contact OFF switch, the output 54A of the low limit comparator 54 transitions from logic zero to logic one, thereby producing the RESET turn-off control signal.

Accordingly, it will be seen that the lighting load 18 can be turned ON/OFF and controlled from one or more remote switching stations 34, 36, as well as from the master switch controller station 32, either manually or by automatic control.

Referring now to FIG. 3, turn-off of the power switch SW1 is accomplished automatically in the absence of motion activity by the motion detector 40. The motion detector 40 produces and analog voltage signal 64 from an infrared sensor IR whose impedance varies in response to a change in infrared energy level. The analog voltage signal 64 is input to the non-inverting (+) terminal of a comparator 66. A reference voltage REF is applied to the inverting terminal (−) of the comparator 66. When the output signal 64 of the motion detector 40 rises above the reference voltage level REF, the comparator output 68 transitions from logic zero to logic one.

The output 68 of the comparator 66 is applied to the RESET input of a divide by N counter 70. By this arrangement, the counter 70 is reset each time the motion detector 40 produces an output signal 64 great enough to cause the comparator 66 to transition. The counter 70 receives as its input an oscillator signal 72 from an oscillator OSC which operates at an adjustable frequency f. The oscillator frequency f and the divide factor N are selected to produce a predetermined time delay, for example two minutes. That is, if motion activity is not sensed by the motion detector 40 over any two minute interval, the counter 70 will produce the N count output control signal 42, which is input to an OR gate 74. The N count control signal 42 is conducted to the RESET input terminal (R) of the latch 60. In response to the RESET impulse, the Q output of the latch 60 transitions from logic one to logic zero, so that the GATE ENABLE signal transitions from logic one to logic zero, thereby disabling the gate control 62 and turning off the master control power switch SW1.

The RESET (OFF) output of the switch logic circuit 50 also forms an input to the OR gate 70. A power on RESET circuit 76 produces a signal POWER ON RESET which is also applied to the input of the OR gate 74. Accordingly, assuming that master control switch SW1 is conducting, a RESET pulse from any one of the switch input logic circuit, the N state counter 70, or the power on RESET circuit 76 will cause the latch 60 to reset and turn off the master control switch SW1.

Figure 4:
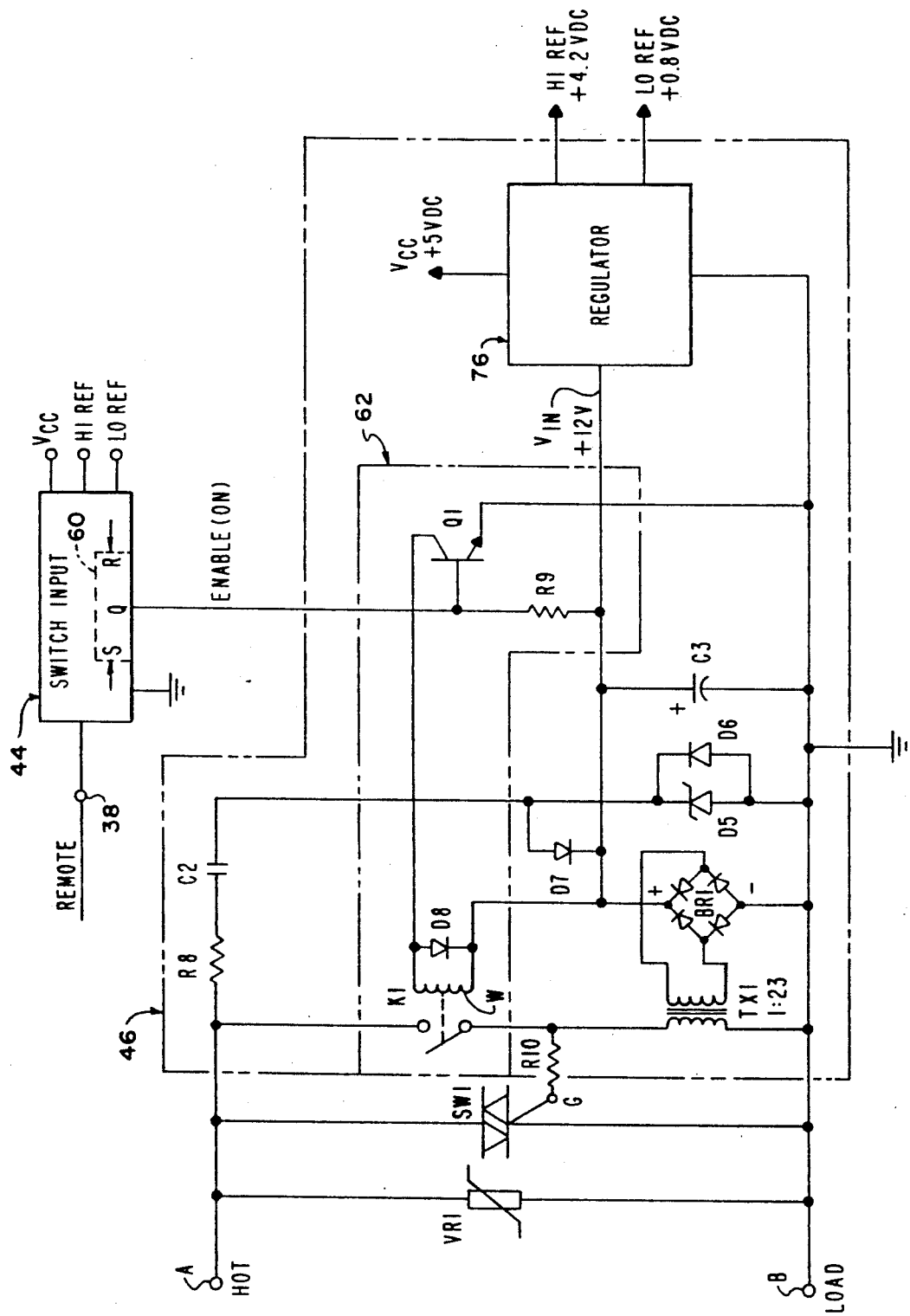
FIG. 4 is a simplified circuit diagram of the dual mode power supply shown in FIG. 3.

Referring now to FIG. 3 and FIG. 4, the DC operating voltages $+V_{cc}$, HI REF and LO REF are maintained by the dual mode power supply 46. When the triac power switch SW1 is turned on, the voltage drop across its switched and unswitched terminals A, B is approximately one volt, which is insufficient without modification for derivation of the $V_{cc}$, and HI REF and LO REF DC operating voltages. The dual mode power supply 46 supplies DC operating voltages in a first operating mode in which the triac power switch SW1 is turned off, and provides the DC operating voltages in a second operating mode when the triac power switch SW1 is turned on.

The dual mode power supply 46 is operable in the first power mode when the triac power switch SW1 is turned off, with full AC power being available at the unswitched triac terminal A which is connected to the AC power hot conductor 12. In this operating mode, AC operating power is conducted to the dual mode power supply 46 through a current limiting resistor R8 and a series connected coupling capacitor C2. The coupling capacitor C2 is connected in series with the anode of a 12 volt Zener diode D5. The cathode terminal of the Zener diode D5 is connected to the system ground reference, which is at load potential. The load potential is essentially at neutral potential when the power switch SW1 is turned off. A steering diode D6 is connected in parallel across the 12 volt Zener diode D5 so that negative phase operating voltage will bypass the Zener diode D5.

In response to the positive phase component of the applied AC excitation, the Zener diode D5 clamps at approximately 12 volts. The 12 volt Zener diode voltage is coupled to a charging capacitor C3 by a steering diode D7. Thus the storage capacitor C3 charges to the clamping voltage of the Zener diode D5 less the diode drop of the steering diode D7, yielding approximately +12 volts DC. The storage capacitor C3 thus maintains an unregulated voltage $V_{in}$ of about +12 volts DC. The unregulated voltage signal $V_{in}$ is input to a DC voltage regulator circuit 76. The DC voltage regulator circuit 76 derives $V_{cc}$ (+5 volts DC), HI REF (+4.2 volts DC) and LO REF (+0.8 volts DC) from the unregulated voltage input signal $V_{in}$. Accordingly, as long as the master power switch SW1 is nonconducting, essentially the full range of the AC operating power is available to be input to the dual mode power supply 46.

However, when the triac power switch SW1 conducts, the AC voltage drop across the switched and unswitched terminals A, B of the triac switch SW1 is approximately one volt, which is not sufficient, by itself, for producing the unregulated voltage $V_{in}$. Operation of the power supply 46 in the second operating mode, when the power triac switch SW1 is turned on, is initiated by the triac driver circuit 62 acting in cooperation with a relay K1 and a step-up transformer TX1. In this arrangement, the switched and unswitched terminals of the relay K1 are connected in series with the primary winding of the step-up transformer TX1. The other terminal of the transformer primary is connected to the switched terminal B of the triac switch SW1, which is at load potential. The switched terminal of the relay K1 is connected to the switched terminal of the triac power switch SW1, which is at hot potential. The gate G of the power triac switch SW1 is coupled to the unswitched terminal of the relay K1 by a current limiting resistor R10.

The triac power switch SW1 is turned on, in either mode, by a transistor switch Q1. The base of the transistor switch Q1 is coupled to the unregulated 12 volt signal $V_{in}$ by a bias resistor R9. The base terminal of the transistor switch Q1 is also connected to the Q output of the latch 60. According to this arrangement, the transistor switch Q1 is turned off when the output Q of the latch 60 is at logic zero. However, when the latch receives a set (ON) signal, the latch output Q transitions from logic zero to logic one, thereby imposing a positive potential across the base to a emitter junction of the transistor switch Q1, causing it to turn on.

The collector of the transistor switch Q1 is connected to the ground terminal of the relay K1, and the emitter of the transistor switch Q1 is connected the ground reference (load) terminal B. The solenoid coil of the relay K1 is connected to the unregulated input node $V_{in}$. A diode D8 is connected in shunt across the solenoid winding W, thereby providing a discharge path for the solenoid winding's collapsing magnetic field. When a turn-on SET signal is applied to the latch 60, the transistor Q1 turns on and provides a ground path for the solenoid winding W. As a solenoid K1 closes, gate turn-on voltage is applied to the gate terminal G through the resistor R10.

The voltage drop (approximately 1 volt AC) across the switched and unswitched triac terminals A, B is sufficient to maintain conduction within the triac switch SW1, but is not sufficient by itself to establish the unregulated operating voltage $V_{in}$. This is accomplished by the step up transformer TX1, whose primary winding is energized when the relay K1 closes. The step-up transformer has a primary to secondary turns ratio of 1: 23, which is sufficient to produce about 24 volts across the secondary winding.

The stepped up voltage is rectified through a bridge rectifier BR1, which includes four diodes interconnected in a full wave bridge rectifier circuit. The input terminals of the bridge rectifier BR1 are connected to the secondary winding of the step-up transformer TX1. The output terminals of the bridge rectifier BR1 are connected to the load terminal B and to the solenoid winding W, respectively. In this arrangement, the rectified voltage from the secondary of the step up transformer TX1 is clamped by the Zener diode D5 to about +12 volts DC, which is input to the voltage regulator 76.

The power supply 46 includes a varistor VR1 which is connected in shunt across the switched and unswitched power terminals A, B of the triac switch SW1. The varistor VR1 is effective for suppressing power surges and high frequency transience which may be propagated along the power conductors 12, 14.

It will be appreciated that the control system of the present invention provides that an electrical load can be turned on/off and controlled from one or more remote switching stations as well as from a master switch controller station, with the on/off control signals produced by the remote switch stations being transmitted to the master controller circuit on a single conductor such as the traveler conductor of a conventional single phase AC power distribution system. The main controller includes a dual mode power supply which derives its operating power from the AC source hot conductor, and is referenced to load potential. The dual mode power supply provides DC operating voltages when the main power switch is turned on as well as when the main power switch is turned off. Accordingly, the electrical load can be turned on and off manually at each remote station, and can be turned off automatically at the master switch station, without disconnecting the internal power supply of the master controller, and without requiring separate power supplies for each remote switch. Moreover, the remote ON/OFF switches do not impose a load on the master controller power supply in the standby operating mode. The remote turn-on and turn-off control signals are developed independently of the power supply in the main controller without interfering with either manual or automatic operation of the master controller.

Preferred values are listed below for the components used in the preferred embodiment. This list of components is merely intended to illustrate the preferred embodiment of the present invention and should in no way be read to limit the invention. Further, the illustrated peripheral connections are appropriate for these components, but modifications must be considered if different components are used even though the components may be functionally equivalent. The resistor values have a tolerance of 5% and a power rating of 178 watt unless otherwise noted.

| Component | Component Value/Type |
|---|---|
| Resistor R1 | 100K ohms |
| Resistor R2 | 100K ohms |
| Resistor R3 | 220K ohms |
| Resistor R4 | 100K ohms |
| Resistor R5 | 100K ohms, 1% |
| Resistor R6 | 100K ohms, 1% |
| Resistor R7 | 10K ohms |
| Resistor R8 | 27 ohms, 2 watt |
| Resistor R9 | 47K ohms |
| Resistor R10 | 47 ohms |
| Resistor R11 | 10K ohms |
| Resistor R12 | 10K ohms |
| Diode D1 | 1N4007, 1000 VR |
| Diode D2 | 1N4007, 1000 VR |
| Diode D3 | 1N914, 100 VR |
| Diode D4 | 1N914, 100 VR |
| Diode D5 | Zener 1N4742, 12 VZ, 1 watt |
| Diode D6 | 1N4001, 50 VR |
| Diode D7 | 1N4004, 400 VR |
| Diode D8 | 1N4004, 400 VR |
| Diode BR1 | General Instrument EDF1BM, 100 VR, 1 amp |
| Comparator 52, 54 | National Dual LM 393 (open collector output) |
| Comparator 66 | National LM 358 |
| Capacitor C1 | 0.1 UF, 100 v |
| Capacitor C2 | 1.2 UF, 400 v |
| Capacitor C3 | 330 UF, 25 v electrolyte |
| Varistor VR1 | Harris V320LA20 |
| Triac SW1 | Teccor Q6008L5, 600 VDM, 8 amps |
| Transistor Q1 | 2N3904 NPN |

Although the invention has been described with reference to a specific embodiment, the foregoing description is not intended to be construed in a limiting sense. Various modifications to the disclosed embodiment, as well as alternative applications of the invention, will be suggested to persons schooled in the art by the foregoing specification and illustration. It is therefore contemplated that the appended claims will cover any such modifications applications or embodiments as fall within the true scope of the invention.

What is claimed is:

1. A control system for selectively applying alternating current electrical power to a load from a power distribution circuit of the type having a hot power conductor, a neutral power conductor, a ground safety conductor and an auxiliary power conductor extending from a remote switch station to a main switch station, in which the load has a switched terminal and an unswitched terminal, and the unswitched terminal of the load is connectable to the neutral power conductor and its switched terminal is connectable to the hot power conductor through a gate controlled switch, said control system comprising, in combination:

a remote switch circuit adapted for installation at the remote station, said remote switch circuit having first and second input means adapted for connection to the hot power conductor and to the ground safety conductor, respectively, for selectively establishing a positive phase input signal and a negative phase input signal on the auxiliary power conductor;

a master switch controller adapted for installation at the main switch station, said master switch controller including (a) a gate controlled power switch having an input terminal adapted for connection to the hot power conductor, an output terminal adapted for connection to the switched terminal of said load, and a gate terminal for receiving a turn-on signal;

(b) a switch logic circuit having input means connectable to the auxiliary power conductor for generating a first control signal on a first output terminal in response to the positive phase input signal and for generating a second control signal on a second output terminal in response to the negative phase input signal; and, (c) a gate control circuit having first and second input means connected to first and second output terminals of the switch logic circuit, respectively, and having an output means connected to the power switch gate in response to a selected one of the first and second control signals, and for applying a gate turn-off signal to the power switch gate in response to the other one of the first and second control signals.

2. A control system as defined in claim 1, wherein the auxiliary power conductor is a traveler conductor which extends from the remote switch station to the main switch station.

3. A control system as defined in claim 1, wherein said first remote switch input means comprises a first diode and a first normally open, manually operable switch connected together in series electrical relation; and, said second remote switch input means comprises a second diode and a second normally open, manually operable switch connected together in series electrical relation.

4. A control system as defined in claim 1, said switch logic circuit input means comprising:

a first comparator having an inverting input, a non-inverting input and an output;

a second comparator having inverting input, a non-inverting input and an output;

the non-inverting input of the first comparator being connected to the inverting input of the second comparator, thereby defining a common signal input terminal connectable to the auxiliary power conductor;

the inverting input of the first comparator being connected to a first reference voltage, and the non-inverting input of the second comparator being connected to a second reference voltage; and, a bias circuit connected to the common input terminal for establishing a DC bias voltage on the common input terminal at a voltage level intermediate the first reference voltage and the second reference voltage.

5. A control system as defined in claim 4, said bias circuit comprising:

first and second resistors of substantially equal resistance value connected in a voltage divider circuit across the common input terminal.

6. A control system as defined in claim 4, including a clamping circuit connected to the common input terminal for limiting the amplitude of positive and negative voltage signals applied to the common input terminal.

7. A control system as defined in claim 6, wherein said bias circuit includes first and second resistors of substantially equal resistance value connected in a voltage divider circuit across the common input terminal, said clamping circuit comprising:

a first diode connected in parallel circuit relation across the first resistor; and, a second diode connected in parallel circuit relation across the second resistor.

8. A control system is defined in claim 4, including a first manually operable, normally open switch having a first switch terminal connected to said common signal input terminal and having a second switch terminal connected to a source of DC operating voltage which is more positive than the first reference voltage; and a second manually operable, normally open switch having a first switch terminal connected to said common input terminal and a second switch terminal connected to a source of ground reference potential which is less positive than the second reference voltage.

9. A control system as defined in claim 1, wherein:

the first control signal generated by the switch logic circuit is a binary signal having logic low and logic high values, and wherein the second control signal generated by the switch logic circuit is a binary signal having logic low and logic high values; and, said gate control circuit comprising a latch having a set input, a reset input and a data output terminal, said set input being coupled to the first output terminal of the switch logic circuit for receiving said first control signal, said reset input terminal being coupled to the second output terminal of the switch logic circuit for receiving the second control signal, and the data output terminal of the latch being coupled to the gate terminal of said gate control power switch.

10. A control system for selectively applying alternating current electrical power to a load from a power distribution circuit of the type having a hot power conductor, a neutral power conductor, a ground safety conductor and an auxiliary power conductor extending from a remote switch station to a main switch station, in which the load has a switched terminal and an unswitched terminal, the unswitched terminal of the load being connectable to the neutral power conductor and its switched terminal being connectable to the hot power conductor through a gate controlled switch, said control system comprising, in combination:

a remote switch circuit adapted for installation at the remote station, said remote switch circuit having first and second input means adapted for connection to the hot power conductor and to the ground safety conductor, respectively, for selectively establishing a positive phase control signal and a negative phase control signal on the auxiliary power conductor;

a master switch controller adapted for installation at the main switch station, said master switch controller including (a) a gate controlled power switch having an input terminal adapted for connection to the hot power conductor, an output terminal adapted for connection to the switched terminal of said load, and a gate terminal for receiving a turn-on signal; and, (b) a gate control circuit having an input means connectable to the auxiliary power conductor and having an output means connected to the power switch gate for applying a gate turn-on signal to the power switch gate in response to a selected one of the positive and negative phase control signals, and for applying a gate turn-off signal to the power switch gate in response to the other one of the positive and negative phase control signals.

11. A control system as defined in claim 10, said gate control circuit input means comprising a switch logic circuit having input means connectable to the auxiliary power conductor for generating a first gate control signal on a first output terminal in response to the positive phase control signal and for generating a second gate control signal on a second output terminal in response to the negative phase input signal.

12. A control system as defined in claim 10, wherein the auxiliary power conductor is a traveler conductor which extends from the remote switch station to the main switch station.

13. A control system as defined in claim 10, wherein said first remote switch input means comprises a first diode and a first normally open, manually operable switch connected together in series electrical relation; and, said second remote switch input means comprises a second diode and a second normally open, manually operable switch connected together in series electrical relation.

14. A control system as defined in claim 10, said gate control input means comprising:

a first comparator having an inverting input, a non-inverting input and an output;

a second comparator having inverting input, a non-inverting input and an output;

the non-inverting input of the first comparator being connected to the inverting input of the second comparator, thereby defining a common signal input terminal connectable to the auxiliary power conductor;

the inverting input of the first comparator being connected to a first reference voltage, and the non-inverting input of the second comparator being connected to a second reference voltage; and, a bias circuit connected to the common input terminal for establishing a DC bias voltage on the common input terminal at a voltage level intermediate the first reference voltage and the second reference voltage.

15. A control system as defined in claim 14, said bias circuit comprising:
   first and second resistors of substantially equal resistance value connected in a voltage divider circuit across the common input terminal.

16. A control system as defined in claim 14, including a clamping circuit connected to the common input terminal for limiting the amplitude of positive and negative voltage signals applied to the common input terminal.

17. A control system as defined in claim 16, wherein said bias circuit includes first and second resistors of substantially equal resistance value connected in a voltage divider circuit across the common input terminal, said clamping circuit comprising:
   a first diode connected in parallel circuit relation across the first resistor; and,
   a second diode connected in parallel circuit relation across the second resistor.

18. A control system is defined in claim 14, including
   a first manually operable, normally open switch having a first switch terminal connected to said common signal input terminal and having a second switch terminal connected to a source of DC operating voltage which is more positive than the first reference voltage; and
   a second manually operable, normally open switch having a first switch terminal connected to said common input terminal and a second switch terminal connected to a source of ground reference potential which is less positive than the second reference voltage.

19. A control system as defined in claim 10, wherein:
   the first control signal generated by the switch logic circuit is a binary signal having logic low and logic high values, and wherein the second control signal generated by the switch logic circuit is a binary signal having logic low and logic high values; and,
   said gate control circuit comprising a latch having a set input, a reset input and a data output terminal, said set input being coupled to the first output terminal of the switch logic circuit for receiving said first control signal, said reset input terminal being coupled to the second output terminal of the switch logic circuit for receiving the second control signal, and the data output terminal of the latch being coupled to the gate terminal of said gate control power switch.

* * * * *

UNITED STATES PATENT AND TRADEMARK OFFICE
CERTIFICATE OF CORRECTION

PATENT NO. : 5,194,858
DATED : March 16, 1993
INVENTOR(S) : William R. Erwin It is certified that error appears in the above-identified patent and that said Letters Patent is hereby corrected as shown below:

Column 5, line 48, "turnoff" should be -- turn-off --;

Column 7, line 18, a space should be placed between "5,128,654" and "entitled";

Column 8, line 12, "ON" should be -- ON --;

Column 8, line 44, a space should be placed between "$V_{cc}$" and "is";

Column 12, line 35, "1: 23" should be -- 1:23 --; and

Column 13, line 63, a comma (,) should be placed after the word "modifications".

Signed and Sealed this

Twenty-third Day of November, 1993

Attest:

BRUCE LEHMAN

*Attesting Officer*　　　　　*Commissioner of Patents and Trademarks*